United States Patent [19]
Maeda

[11] Patent Number: 5,888,259
[45] Date of Patent: Mar. 30, 1999

[54] FILTER DEVICE FOR COMPRESSED AIR

[75] Inventor: Sadao Maeda, Okazaki, Japan

[73] Assignee: Maeda Limited, Japan

[21] Appl. No.: 862,299

[22] Filed: May 22, 1997

[51] Int. Cl.⁶ .................................................. B01D 46/00
[52] U.S. Cl. .............................. 55/323; 55/478; 55/480; 55/482; 55/525; 55/DIG. 17
[58] Field of Search ........................ 95/286, 287; 55/482, 55/323, DIG. 17, 478, 479, 480, 525, 527, 486, 487, 503

[56] References Cited

U.S. PATENT DOCUMENTS

| | | | |
|---|---|---|---|
| 3,353,339 | 11/1967 | Walter | 55/482 |
| 4,015,959 | 4/1977 | Grote | 55/DIG. 17 |
| 4,385,913 | 5/1983 | Lane | 55/DIG. 17 |
| 4,487,618 | 12/1984 | Mann | 55/323 |
| 4,600,416 | 7/1986 | Mann | 55/323 |
| 4,848,989 | 7/1989 | Maeda | 55/482 |
| 4,865,815 | 9/1989 | Martin et al. | 55/323 |
| 4,897,094 | 1/1990 | Maeda | 55/323 |
| 4,925,466 | 5/1990 | Overby | 55/DIG. 17 |
| 5,011,519 | 4/1991 | Maeda | 55/323 |
| 5,061,300 | 10/1991 | Alexander, III | 55/482 |

FOREIGN PATENT DOCUMENTS 62-1763   1/1987   Japan .

*Primary Examiner*—Duane S. Smith
*Attorney, Agent, or Firm*—Parkhurst & Wendel

[57] ABSTRACT

A filter device for compressed air in which the filter packings can be easily and quickly replaced. A first packing is accommodated in a first sleeve, a second packing is accommodated in a second sleeve, and an inlet passage portion defines an inlet passage for introducing compressed air from the exterior to the first sleeve. A guide passage portion defines a guide passage for guiding compressed air from the first sleeve to the second sleeve, and an outlet passage portion defines an outlet passage for discharging the compressed air out of the second sleeve to the exterior. The first and second sleeves, the inlet passage portion, the guide passage portion and the outlet passage portion are integrally formed of a synthetic resin, thus forming a unitary body for the filter device. The body contains access openings through which the first and second packings are independently removable, and a closure member is removably attached to each access opening to close the access opening and provide fluid-tightness.

10 Claims, 11 Drawing Sheets

FILTER DEVICE FOR COMPRESSED AIR

BACKGROUND OF THE INVENTION

1. Field of the Invention

The present invention relates in general to a filter device for compressed air which has filter means having suitable packings accommodated in suitable sleeves, and more particularly to such a filter device for compressed air in which the packings can be easily and quickly replaced.

2. Discussion of the Related Art

Generally, passages for supplying compressed air to various pneumatically operated components used in various factories and atomic plants, for example, are provided with filter devices for removing water and oil contained in a flow of the compressed air, for the purpose of protecting the pneumatic components or improving the performance of those components.

One type of such a filter device for compressed air is disclosed in laid-open Publication No. 62-1763 of examined Japanese Patent Application, which is constructed as shown in FIG. 14. This disclosed filter device includes two kinds of filter means. Namely, the filter device 90 includes first filter means 12 having a suitable first packing 93 accommodated in a first sleeve 92 thereof, and second filter means 14 having a suitable second packing 95 accommodated in a second sleeve 94 thereof. The first and second filter means 12, 14 are disposed parallel with each other on a trap chamber 96 having a suitable volume capacity, so as to extend in the vertical direction from the trap chamber 96, such that each of the first and second filter means 12, 14 communicates with the trap chamber 16.

The trap chamber 96 consists of a guide passage portion 98 and a drain portion 100 which are fixed to each other by suitable bolts. The guide passage portion 98 communicates with the first and second filter means 12, 14, and has a guide passage 44 formed therein, so that the compressed air is fed through the guide passage 44 from the first filter means 12 to the second filter means 14. The lower open end of the guide passage 98 is fluid-tightly closed by the drain portion. To the bottom wall of the drain portion 100, there is attached a drain device in the form of a weep valve 102 through which a liquid separated from the compressed air by the first filter means 12 and accumulated in the trap chamber 96 is discharged out of the filter device 90.

On the first and second filter means 12, 14, there is disposed a manifold 108 which includes an inlet passage portion 104 and an outlet passage portion 106. The inlet passage portion 104 has an inlet passage 37 formed therein, through which the compressed air is introduced into the filter device 90. The outlet passage portion 106 has an outlet passage 39 formed therein, through which the compressed air is fed out of the filter device 90. The inlet and outlet passages 37, 39 communicate with the first and second filter means 12, 14, respectively.

The first and second filter means 12, 14, the trap chamber 96 and the manifold 108 are assembled together and fixed to each other by a plurality of bolts 110 which extend through the manifold 108 and which are screwed in the guide passage portion 98 of the trap chamber 96. According to this arrangement, the compressed air entering the inlet passage 37 of the manifold 108 is fed through the first filter means 12 into the trap chamber 96, and then through the second filter means 14 into the outlet passage 39 of the manifold 108, whereby an air passage for the compressed air is formed through the filter device 90.

In the filter device 90 constructed as described above, usually, a wound wire mesh fabric formed of stainless steel fibers or other metallic materials is used for the first packing 93 of the first filter means 12, so that vapor and/or liquid particles like water and oil contained in the compressed air are condensed or coalesced as the compressed air passes through the first filter means 12. For the second packing 95 of the second filter means 14, usually, a wound fabric mesh formed of cotton fibers is used, so that the liquid particles contained in the compressed air are absorbed and vaporized as the compressed air passes through the second filter means 14.

Thus, in the filter device 90 disclosed in the above-indicated publication, the vapor and/or liquid particles are condensed or coalesced as the compressed air is introduced into the trap chamber 96 through the inlet passage 37 of the manifold 108 and the first filter means 12, so that the vapor and/or liquid particles are separated from the compressed air. Further, the compressed air from which the vapor and/or liquid particles have been thus separated is introduced into the second filter means 14 through the trap chamber 98, so that the amount of the liquid particles remaining in the compressed air is minimized.

The first and second packings 93, 95 constituting the first and second filter means 12, 14, respectively, are required to be replaced with clean ones when the packings 93, 95 get clogged with dust and/or grease. The replacement requires the following operations.

First, the plurality of bolts 110 serving to connect the first and second filter means 12, 14, the manifold 108 and the trap chamber 96 into an integral assembly are all removed, and the assembly is disassembled into the four parts. Secondly, the clogged first and second packings 93, 95 which are accommodated in the first and second sleeves 92, 94, respectively, are replaced with clean ones. And then, the first and second filter means 12, 14, the trap chamber 96 and the manifold 108 are assembled together and fixed to each other, as described before, by screwing the plurality of bolts 110 in the respective positions.

That is, in the conventional filter device 90 disclosed in the above-identified publication, each time the first and second packings 93, 95 of the first and second filter means 12, 14 are replaced, the device 90 has to be disassembled into the parts before the replacement, and the parts have to be reassembled into the device 90 after the replacement.

The filter device 90 is advantageously used in various factories, atomic plants and medical field owing to its high filtering performance. However, the filter device 90 requires the above-described operations for replacing the first and second packings 93, 95, which operations are cumbersome and time-consuming, as described above. There is still a room for improvement in this filter device 90.

SUMMARY OF THE INVENTION

The present invention was developed in the light of the above situations. It is therefore an object of the present invention to provide an improved construction of the filter device for compressed air, which construction makes it possible to replace the packings of the filter means easily and quickly.

The above object may be achieved according to the present invention which provides a filter device for compressed air including first filter means having a first packing accommodated in a first sleeve thereof, second filter means having a second packing accommodated in a second sleeve thereof, an inlet passage portion defining an inlet passage which connects an exterior of the filter device and the first sleeve to introduce the compressed air from the exterior into the first filter means, a guide passage portion defining a guide passage which connects the first sleeve and the second sleeve to guide the compressed air from the first filter means into the second filter means, and an outlet passage portion defining an outlet passage which connects the second sleeve and the exterior to discharge the compressed air from the second filter means to the exterior, the compressed air which has been introduced through the inlet passage portion being introduced through the first filter means to the guide passage portion, whereby vapor or liquid particles contained in the compressed air are condensed or coalesced and thereby separated from the compressed air, the compressed air from which the vapor or liquid particles have been separated being introduced through the guide passage portion into the second filter means, whereby the liquid particles remaining in the compressed air are absorbed by the second filter means or vaporized, the filter device being characterized in that the first and second sleeves, the inlet passage portion, the guide passage portion and outlet passage portion are formed of a synthetic resin, integrally with each other, so as to constitute a body of the filter device, the body being provided with access openings through which the first and second packings are removed from the filter device, an closure member being removably attached to each of the access openings so as to fluid-tightly close the access openings.

According to a first preferred form of the filter device for compressed air of the present invention, the first packing of the first filter means is a metallic fiber aggregation which is formed by randomly aggregating a large number of short fibers or long fibers made of a metallic material.

According to a second preferred form of the filter device for compressed air of the present invention, the body is formed of a transparent synthetic resin, as a single unit.

According to a third preferred form of the filter device for compressed air of the present invention, wherein the first sleeve includes a communication portion which communicates with the inlet passage portion and which is dimensioned to permit the first packing to be removed therethrough, while the second sleeve includes a communication portion which communicates with the outlet passage portion and which is dimensioned to permit the second packing to be removed therethrough, each of the inlet passage portion and the outlet passage portion having one of the access openings formed therethrough, so that the first and second packings can be removed from the first and second sleeves, respectively, through the access openings.

According to a fourth preferred form of the filter device for compressed air of the present invention, wherein a retainer plate having a plurality of through-holes formed therethrough is removably attached to each of the communication portion which communicates with the inlet passage portion and the communication portion which communicates with the outlet passage portion, and the closure member has at least one leg provided at a portion thereof opposed to the retainer plate and extending towards the retainer plate, the first sleeve including a communication portion which communicates with the guide passage portion, while the second sleeve including a communication portion which communicates with the guide passage portion, and wherein a protruding portion or a shoulder portion is provided at each of the communication portion communicating with the inlet passage portion and the communication portion communicating with the outlet passage portion, the protruding portion or the shoulder portion protruding by a predetermined distance radially inwardly of the first and second sleeves, so that each of the first and second packings is interposed between the retainer plate and the protruding portion or the shoulder portion, while the closure member is attached to each of the access openings such that the retainer plate is pressed by the at least one leg of the closure member.

As is apparent from the above explanation, the filter device for compressed air of the present invention is constructed such that all the parts cooperating to form a fluid passage in the filter device are formed of a synthetic resin, integrally with each other so as to constitute a body of the filter device, and the body is provided with access openings through which the first and second packings are removed. Further, the closure member is removably attached to each of the access openings so as to fluid-tightly close the access openings. According to the present filter device, therefore, for replacing the clogged first and second packings, it is not necessary to carry out time-consuming operations such as disassembling of the filter device into the component parts and an reassembling of the parts into the device, which are required in the conventional device. In the present filter device, the clogged first and second packings can be replaced by new ones, by simply removing the caps from the respective access openings and reattaching the caps to the respective access openings. Thus, the replacement of the first and second packings can be made more easily and quickly than in the conventional device.

Further, since the present filter device is constructed such that all the parts cooperating to form the fluid passage in the filter device are formed of a synthetic resin, integrally with each other so as to constitute a body of the filter device as a single unit, as described above, the present filter device assures a remarkable increase in fluid-tightness reliability, as compared with that of the conventional device wherein separate parts are connected by bolts through suitable packings.

Where the construction according to the above-described first preferred form of the invention is employed, it is not necessary to weave or knit the metallic fibers as required in the conventional device, for preparing the first packing. Thus, the operation for the preparation of the first packing or the whole filter device is made easier, and therefore the operation cost is reduced. Besides, the first packing is constituted by a comparatively small amount of the metallic fibers, but the condensation and/or coalescence of the vapor and/or liquid particles in the first filter means can be effected as efficiently as in the conventional device. Thus, the construction according to the present first preferred form permits significant reduction of the weight of the filter device and the material cost, without deteriorating the filtering performance.

Where the construction according to the above-described second preferred form of the invention is employed, the state of clogging of the first and second packings of the first and second filter means can be observed through the transparent body, making it easy to know a time of replacement of the first and second packings.

Where the construction according to the above-described third preferred form of the invention is employed, the inlet passage portion and the outlet passage portion are provided with the respective access openings. Therefore, even if the compressed air leaks out from the body through the access openings, the air leakage has a comparatively small influence on the flow velocity and the pressure of the compressed air flowing through the first and second sleeves and the guide passage portion, as compared with an arrangement wherein the compressed air may leak through the first sleeve and/or the second sleeve and/or the guide passage portion. Accordingly, the present construction prevents or minimizes a deterioration of the filtering performance of the first and second filter means.

Where the construction according to the above-described fourth preferred form of the invention is employed, the retainer plate fitted in each one of the first and second sleeves is pressed by the leg provided to the closure member, so that each of the first and second packings is interposed between the retainer plate and the protruding portion or the shoulder portion provided at the lower portion of the corresponding one of the first and second sleeves. Therefore, the first and second packings are fixedly disposed in the respective sleeves, whereby the first and second packings are effectively prevented from being displaced by the flow of the compressed air.

DETAILED DESCRIPTION OF THE PREFERRED EMBODIMENT

To further clarify the present invention, there will be described in detail one preferred embodiment of the present invention by reference to the drawings.

Figure 1:
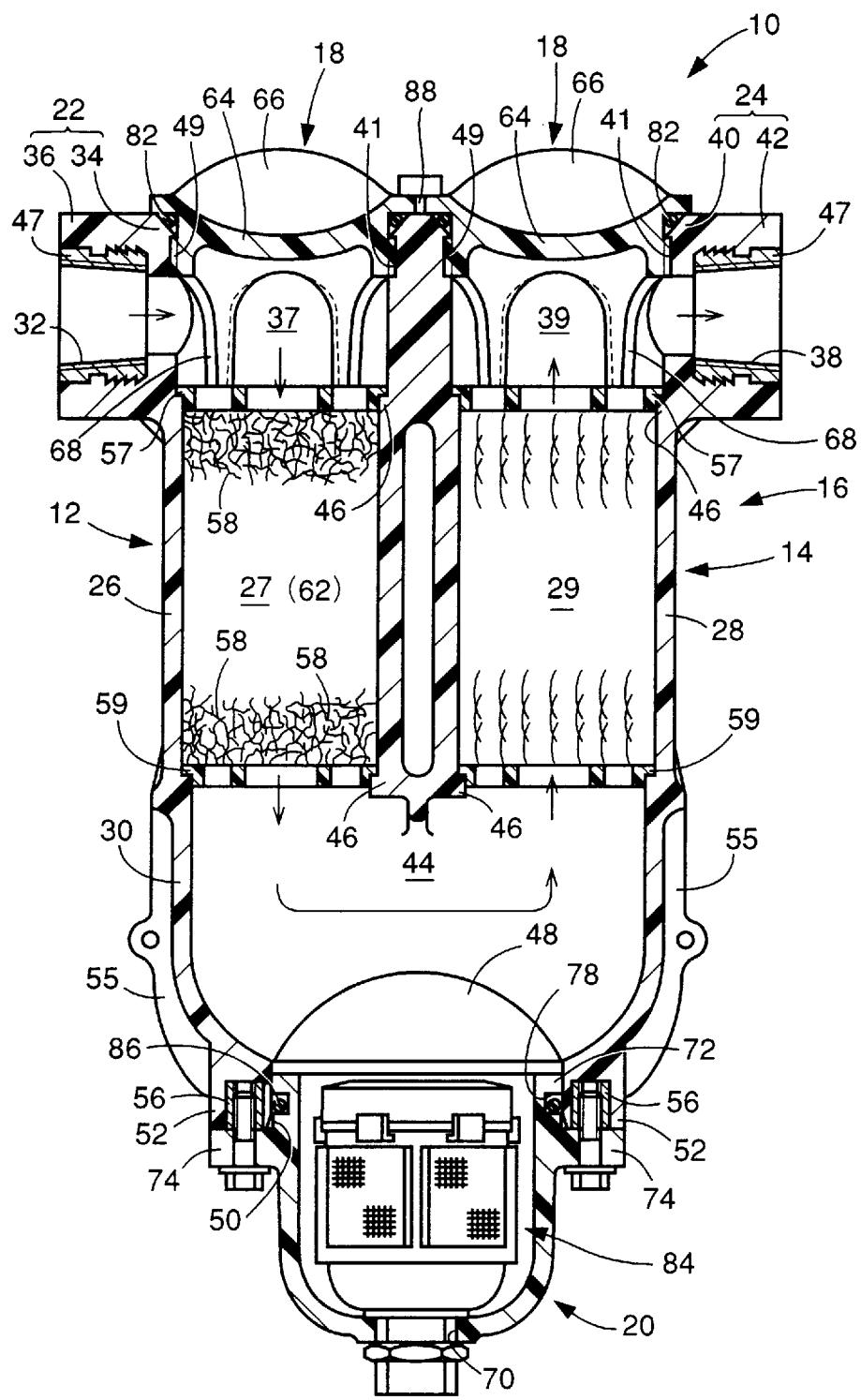
FIG. 1 is an elevational view in vertical cross section showing a filter device for compressed air having a construction according to the present embodiment.
Figure 2:
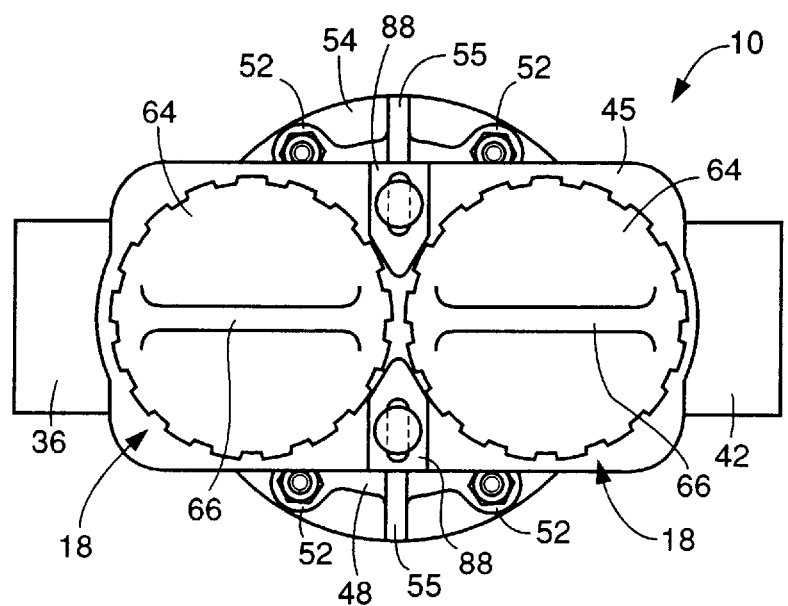
FIG. 2 is a top plan view showing the filter device of FIG. 1.
Figure 3:
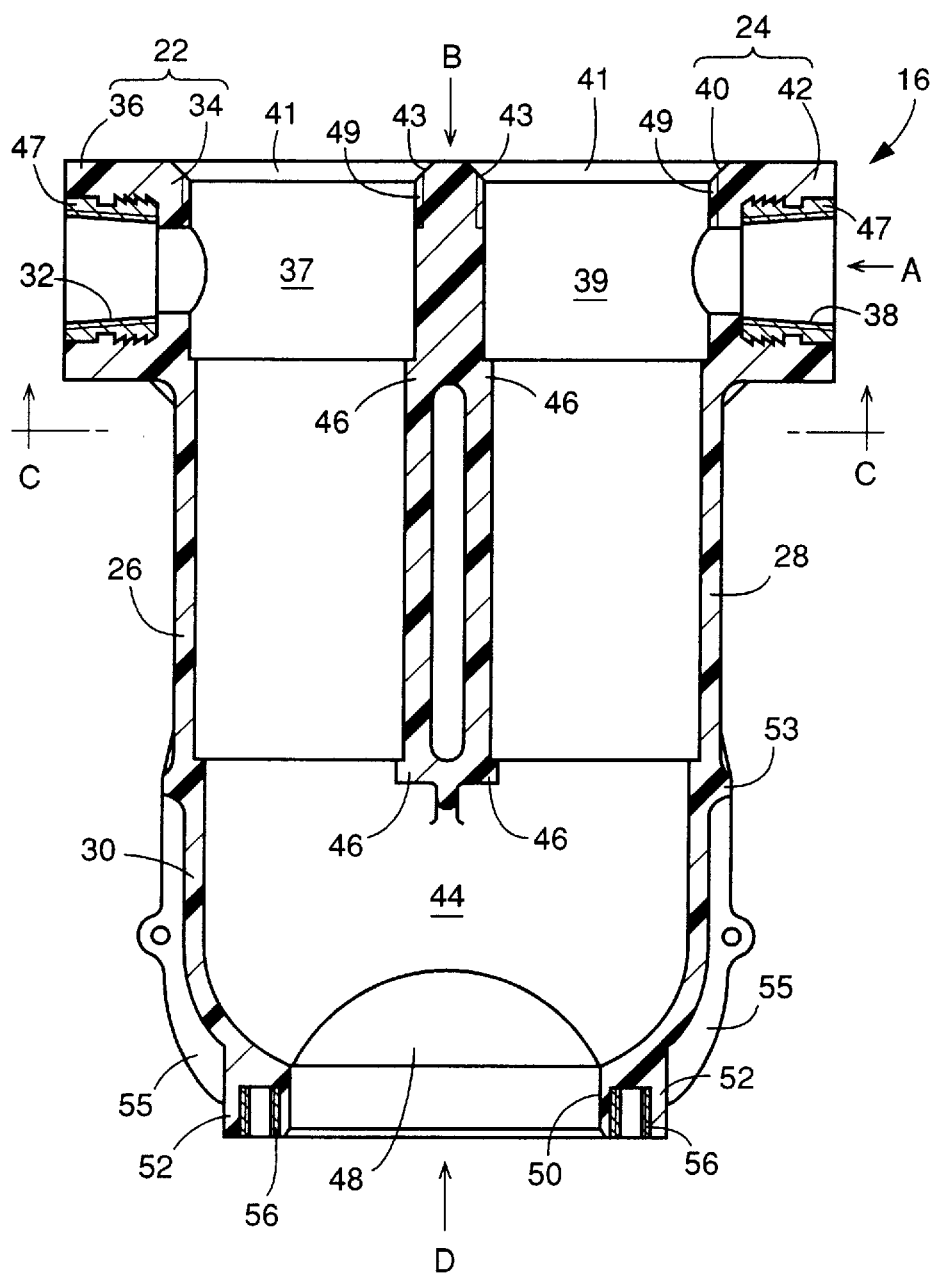
FIG. 3 is an elevational view in vertical cross section showing a body of the filter device of FIG. 1.
Figure 4:
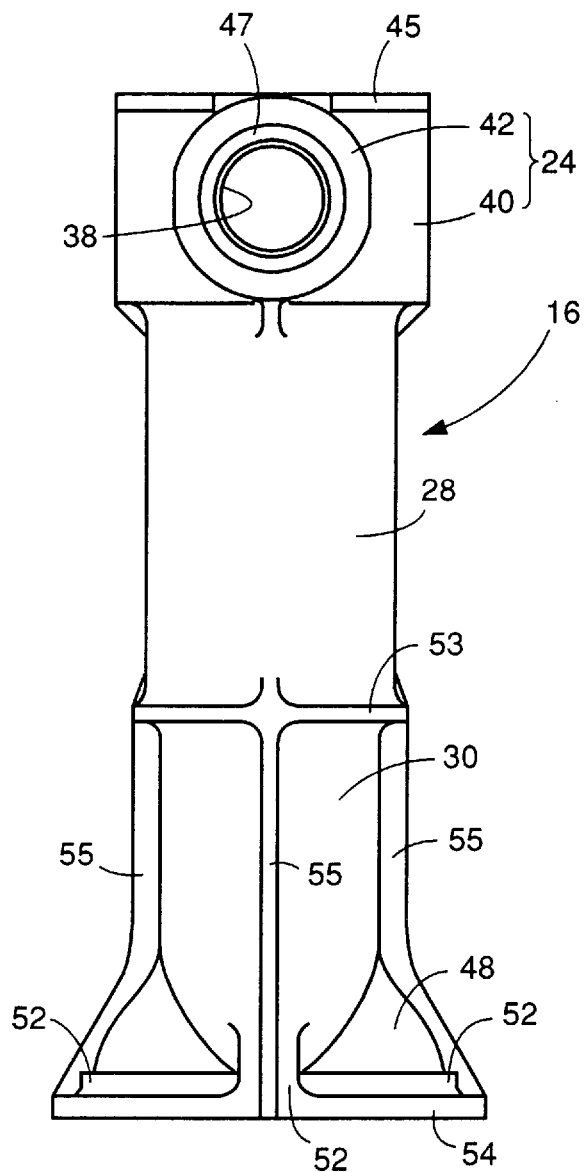
FIG. 4 is a view taken in a direction of arrow A in FIG. 3.
Figure 5:
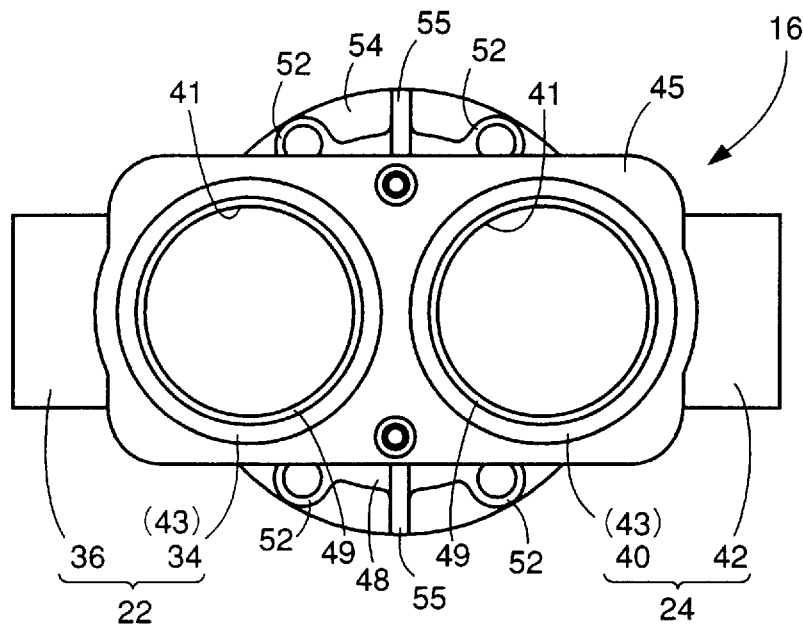
FIG. 5 is a view taken in a direction of arrow B in FIG. 3.
Figure 6:
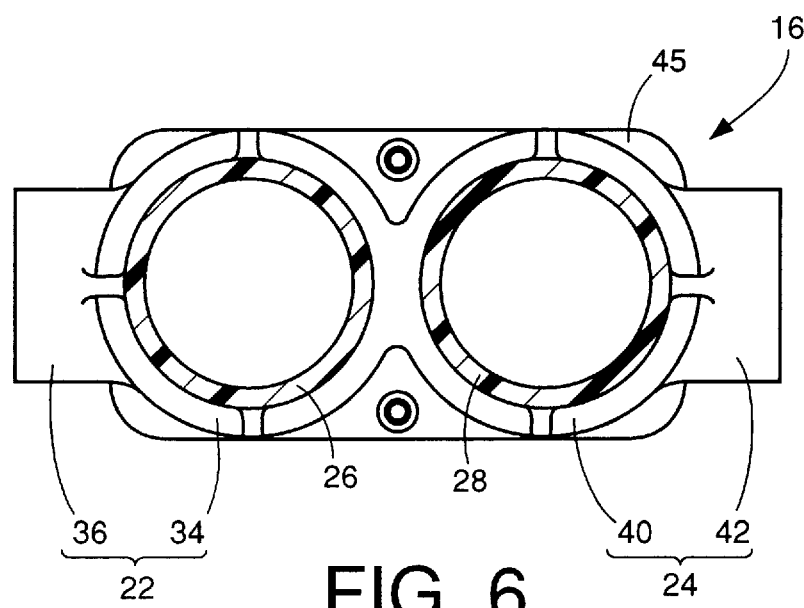
FIG. 6 is a cross-sectional view taken along line C—C in FIG. 3.
Figure 7:
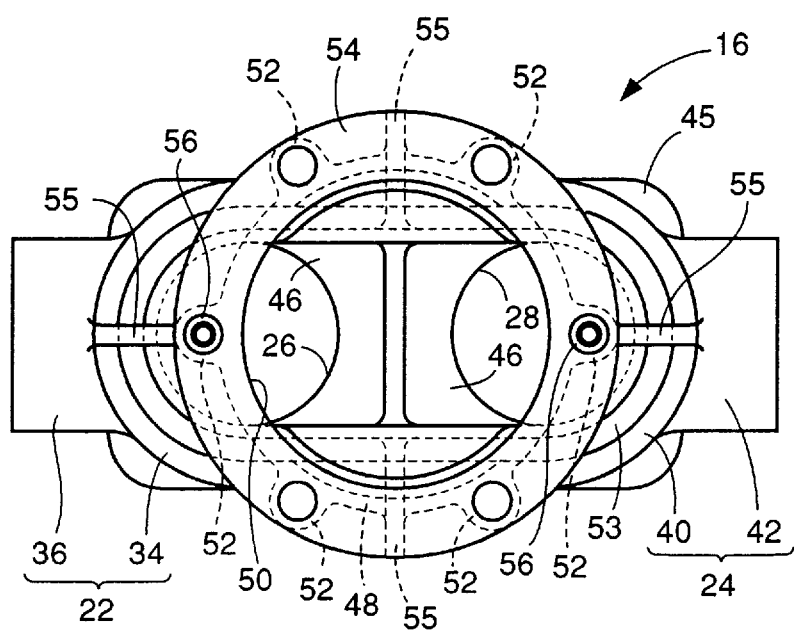
FIG. 7 is a view taken in a direction of arrow D in FIG. 3.

Referring first to FIGS. 1 and 2, there is schematically shown one embodiment of a filter device for compressed air constructed according to the present invention. As is apparent from the figures, the filter device 10 consists of a body 16, two caps 18 and a drain unit 20. The body 16 accommodates first and second filter means 12, 14 therein. The two caps 18 are attached to the top of the body 16, and serve as closure members. The drain unit 20 is attached to the bottom of the body 16.

More specifically described, as shown in FIGS. 3 through 7, the body 16 includes an inlet passage portion 22, an outlet passage portion 24, first and second sleeves 26, 28 and a guide passage portion 30 which are formed integrally with each other, and which cooperate to constitute the body 16.

The inlet passage portion 22 consists of an inlet communication portion 34 and an inlet portion 36. The inlet communication portion 34 takes a substantially cylindrical shape having a large cylindrical wall thickness, and extends parallel to an axial direction of the body 16, i.e., extends in a vertical direction as viewed in FIG. 3. The inlet communication portion 34 has an upper opening communicating with the exterior, and a lower opening communicating with the first sleeve 26. The inlet portion 36 takes a substantially cylindrical shape having a large cylindrical wall thickness and a diameter smaller than that of the inlet communication portion 34. The inlet portion 36 is formed integrally with the inlet communication portion 34 such that the inlet portion 36 extends outwardly from a cylindrical wall of the inlet communication portion 34. The inlet portion 36 has an opening at each of its opposite ends. One of the openings remote from the inlet communication portion 34 communicates with the exterior, and serves as an inlet 32 for introducing the compressed air from the exterior into the filter device 10. The inlet portion 36 communicates at the other of the openings with the inlet communication portion 34.

The outlet passage portion 24 consists of an outlet communication portion 40 and an outlet portion 42. The outlet communication portion 40 has a construction substantially identical with that of the inlet communication portion 34, while the outlet portion 42 has a construction substantially identical with that of the inlet portion 36. Each of the outlet communication portion 40 and the outlet portion 42 takes a substantially cylindrical shape having a large cylindrical wall thickness. The outlet communication portion 40 having a diameter larger than that of the outlet portion 42 extends parallel to the axial direction of the body 16, i.e., extends in the vertical direction as viewed in FIG. 3. The outlet communication portion 40 has an upper opening communicating with the exterior, and a lower opening communicating with the second sleeve 28. The outlet portion 42 is formed integrally with the outlet communication portion 40 such that the outlet portion 42 extends outwardly from a cylindrical wall of the outlet communication portion 40. The outlet portion 42 has an opening at each of its opposite ends. One of the openings remote from the outlet communication portion 40 communicates with the exterior, and serves as an outlet 38 for discharging the compressed air out from the filter device 10 to the exterior. The outlet portion 42 communicates at the other of the openings with the outlet communication portion 40. A reference numeral 47 in FIGS. 3 and 4 designates a metallic connector, which is fixed in a hole in each of the inlet 32 and outlet 38, for connecting a suitable pipe with the filter device 10.

The inlet passage portion 22 and the outlet passage portion 24 are arranged in parallel with each other such that the inlet 32 and the outlet 38 extend in a direction perpendicular to the axial direction of the body 16, and such that the inlet 32 and the outlet 38 open in the opposite direction. A portion of the cylindrical wall of the inlet communication portion 34 which portion is radially remote from the inlet portion 36 is connected with a portion of the cylindrical wall of the outlet communication portion 40 which portion is radially remote from the outlet portion 42.

Thus, the inlet passage portion 22 and the outlet passage portion 24 are united with each other. The first sleeve 26 communicates through the inlet passage portion 22 with the exterior, while the second sleeve 28 communicates through the outlet passage portion 24 with the exterior. The inlet passage portion 22 has an inlet passage 37 formed therein, for introducing the compressed air from the exterior into the first sleeve 26 (the first filter means 12). The outlet passage portion 24 has an outlet passage 39 formed therein, for feeding the compressed air out from the second sleeve 28 (the second filter means 14) to the exterior.

Each of the upper and lower openings of the inlet communication portion 34 has an inside diameter substantially equal to or slightly larger than that of the first sleeve 26, while each of the upper and lower openings of the outlet communication portion 40 has an inside diameter substantially equal to or slightly larger than that of the second sleeve 26. This dimensioning makes it possible to remove a first packing 27 which constitutes the first filter means 12 and which is accommodated in the first sleeve 26, through the upper and lower openings of the inlet communication portion 34, and to remove a second packing 29 which constitutes the second filter means 14 and which is accommodated in the second sleeve 28, through the upper and lower openings of the outlet communication portion 40 (see FIG. 1). Thus, the upper openings of the inlet communication portion 34 and the outlet communication portion 40 function as access openings 41 through which the first and second packings 27, 29 are removed from the first and second sleeves 26, 28, respectively.

Each of the inlet communication portion 34 and the outlet communication portion 40 includes a tapered portion 43 which is chamfered at the internal periphery of a corresponding one of the access openings 41, and an internal thread portion 49 which is internally threaded and which is axially adjacent to the tapered portion 43. The tapered portion 43 has a diameter which increases in the axial direction towards the exterior (upwardly). Further, the inlet communication portion 34 and the outlet communication portion 40 are united at the outer peripheries of their upper end portions, with a generally rectangular plate-like flange 45 which protrudes outwardly from the outer peripheries of the inlet communication portion 34 and the outlet communication portion 40 over a predetermined distance.

Each of the first and second sleeves 26, 28 communicating with the inlet communication portion 34 and the outlet communication portion 40, respectively, takes the form of a cylindrical shape. The height and the inside diameter of the first sleeve 26 are substantially equal to those of the second sleeve 28. The inside diameter of the first sleeves 26 is sufficiently larger than that of the inlet 32, while the inside diameter of the second sleeves 28 is sufficiently larger than that of the outlet 38. In other words, the cross sectional areas of fluid flow through the first and second sleeves 26, 28 are larger than the opening areas of the inlet 32 and the outlet 38, respectively. The thus constructed first and second sleeves 26, 28 are united with the inlet communication portion 34 and the outlet communication portion 40, respectively, so as to extend parallel to each other in the axial direction of the body 16, from the lower ends of the inlet communication portion 34 and the outlet communication portion 40, respectively. The first and second sleeves 26, 28 communicate at their lower openings with the guide passage portion 30.

The guide passage portion 30 communicating with the first and second sleeves 26, 28 is a generally cup-shaped structure which is substantially elliptical in horizontal cross section and whose depth is larger than the respective inside diameters of the first and second sleeves 26, 28. Further, the guide passage portion 30 has an outwardly bulging bottom portion 48 having a substantially semi-spherical shape. The bulging bottom portion 48 has a through-hole 50 formed through its bottom wall in communication with the exterior. According to the above-described arrangement, the first and second sleeves 26, 28 communicate with each other through the guide passage portion 30 having a cross sectional area larger than that of the first and second sleeves 26, 28. Thus, the guide passage portion 33 provides a guide passage 44, so that the compressed air is introduced from the first sleeve 26 to the second sleeve 28 through this guide passage 44. The guide passage 44 communicates with the exterior through the through-hole 50 formed through the bottom portion of the guide passage portion 30.

The guide passage portion 30 has six bolt-hole portions 52 integrally formed at a lower part of the bulging bottom portion 48 such that the bolt-hole portions 52 extend downwardly from the outer surface of the bottom portion 48, and such that the six bolt-hole portions 52 are spaced apart from each other in the circumferential direction of the bottom portion 48 at a predetermined spacing interval. The six bolt-hole portions 52 receive suitable bolts for fixedly attaching the drain unit 20 to the guide passage portion 30. Among the six bolt-hole portions 52, predetermined two bolt-hole portions has metallic connectors 56 fixedly received therein, for engagement with the bolts. On the outer surface of the lower part of the bulging bottom portion 48, there is also formed a connecting rib 54 integrally with the six bolt-hole portions 52. The connecting rib 54 takes the form of a outward flange extending circumferentially of the bulging bottom portion 48, so as to connect the six bolt-hole portions 52 and thereby reinforce the six bolt-hole portions 52. Further, the guide passage portion 30 has a reinforcing rib 53 integrally formed on an upper end portion of its cylindrical wall, so as to extend in the circumferential direction, and four reinforcing ribs 55 each of which extends vertically from the reinforcing rib 53 to the connecting rib 54. Thus, the guide passage portion 30 is reinforced by the ribs 53, 55.

The inlet passage portion 22, the outlet passage portion 24, the first and second sleeves 26, 28 and the guide passage portion 30 which are constructed as described above are integrally formed of a transparent synthetic resin such as polycarbonate, polyethylene terephthalate and polyamide, whereby the body 16 is formed as an one-piece molding of the transparent synthetic resin.

In the thus constructed body 16, the first and second packings 27, 29 are accommodated in the first and second sleeves 26, 28 as the first and second filter means 12, 14, respectively. At the upper and lower openings of each of the first and second sleeves 26, 28, there are provided shoulder portions 46 for engagement with respective upper and lower retainer plates 57, 59 each having a plurality of through-holes formed therethrough. Thus, the first and second packings 27, 29 are accommodated in the respective first and second sleeves 26, 28 such that the packings 27, 29 are interposed between the upper and lower retainer plates 57, 59 in the vertical direction.

Figure 8:
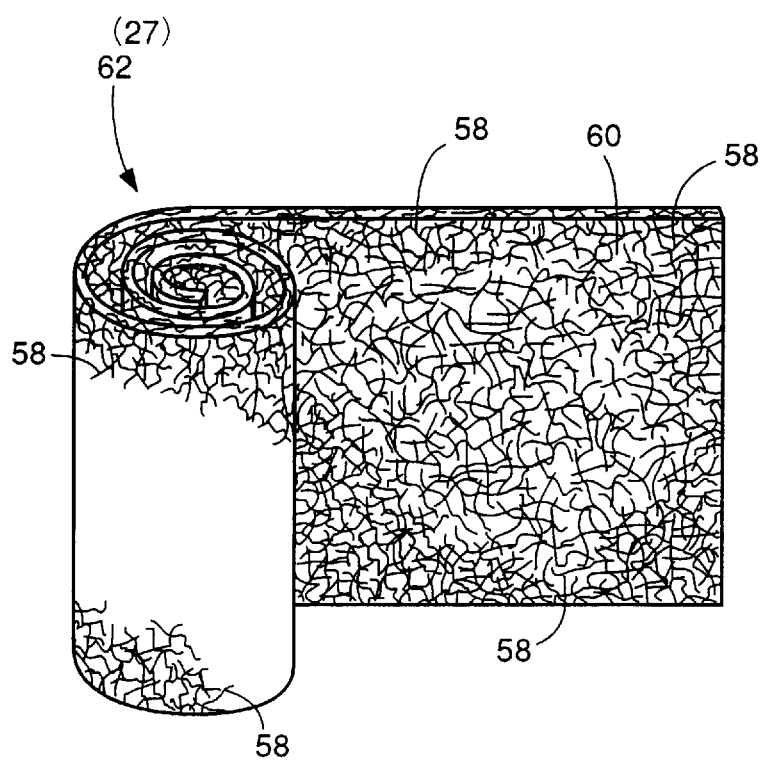
FIG. 8 is a view showing an example of a first packing constituting a first filter means of the filter device of FIG. 1.

The first packing 27 of the first filter means 12 is a metallic-fiber aggregation which is formed by randomly aggregating a large number of short fibers or long fibers 58 made of stainless steel fibers or other metallic materials. As shown in FIG. 8, the large number of short fibers or long fibers 58 are complicatedly tangled with each other, so as to constitute a sheet-like fabric 60 having a predetermined thickness. The sheet-like fabric 60 is wound up into a roll 62 having a cylindrical shape corresponding to an internal shape of the first sleeve 29. As the second packing 29 of the second filter means 14, a wound fabric mesh formed of cotton fibers is employed as in the conventional filter device.

Figure 9:
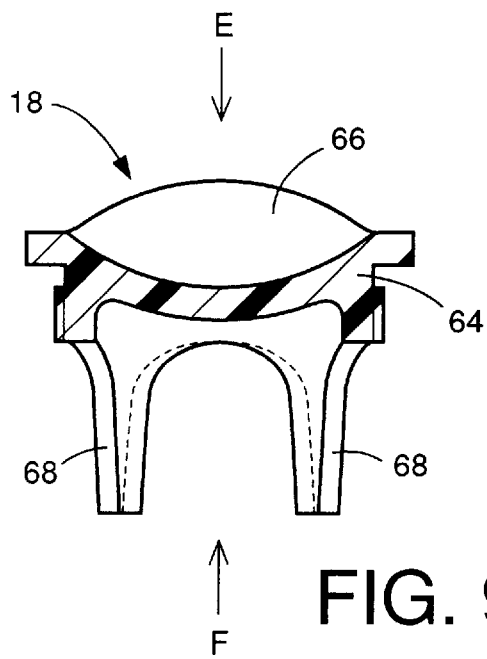
FIG. 9 is an elevational view in vertical cross section showing an example of a closure member which is attached to the filter device of FIG. 1.
Figure 10:
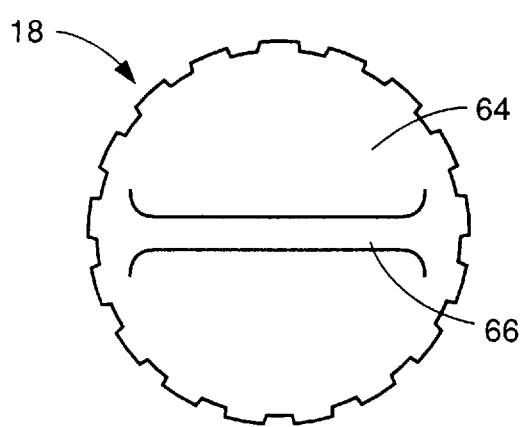
FIG. 10 is a view taken in a direction of arrow E in FIG. 9.
Figure 11:
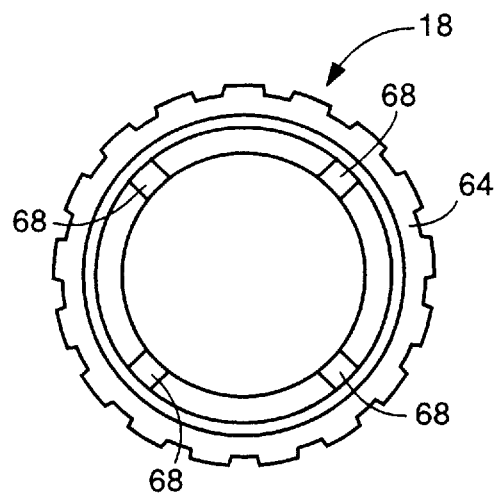
FIG. 11 is a view taken in a direction of arrow F in FIG. 9.

Like the body 16, the caps 18 which are attached to the upper side of the body 16 are formed of a synthetic resin such as polycarbonate, polyethylene terephthalate and polyamide. As shown in FIGS. 9–11, each of the caps 18 consists of a generally disc-like stepped threaded portion 64, a knob portion 66 and a leg portion 68. The threaded portion 64 includes a large diameter portion and a small diameter portion. The upper portion of the outer circumferential surface of the large diameter portion has a succession of grooves. The lower portion of the outer circumferential surface of the small diameter portion has an external thread. The knob portion 66 is integrally formed on the upper face of the threaded portion 64. The leg portion 68 is integrally formed on the lower face of the threaded portion 64, and includes four legs which are equi-angularly spaced apart from each other in the circumferential direction of the threaded portion 64, and which extend downwardly from the outer portion of the lower face of the threaded portion 64. Each of the legs has a predetermined length and width.

Figure 12:
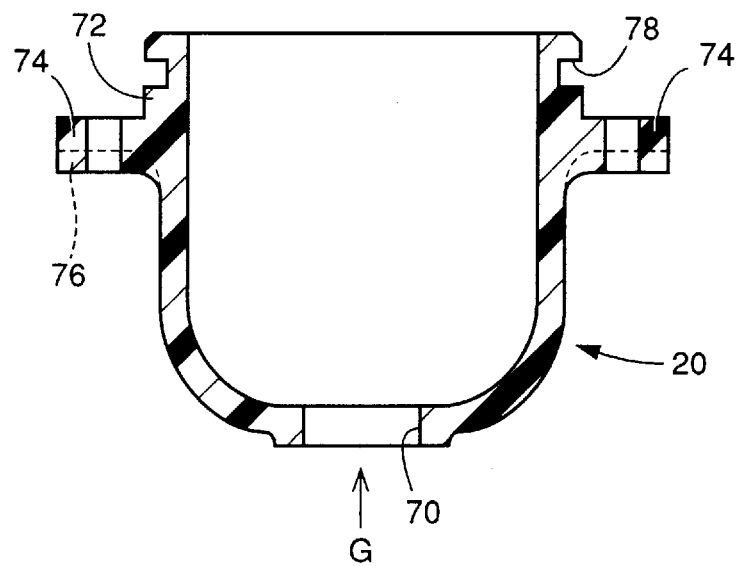
FIG. 12 is an elevational view in vertical cross section showing an example of a drain unit which is attached to the filter device of FIG. 1.
Figure 13:
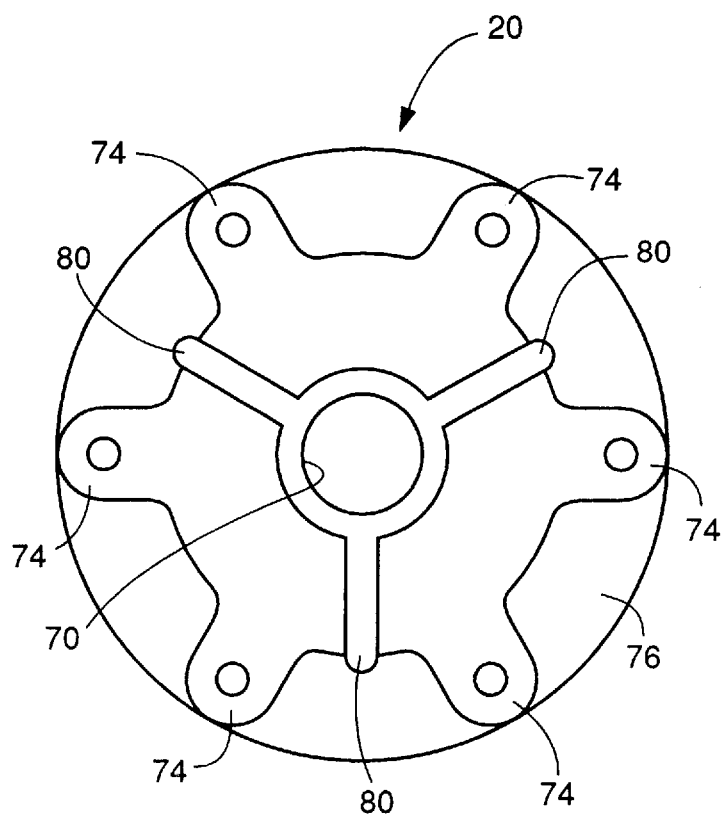
FIG. 13 is a view taken in a direction of arrow G in FIG. 12.

The drain unit 20 which is to be attached to the lower side of the body 16 is formed of the same synthetic resin as the body 16 and the caps 18. The drain unit 20 is a generally cup-shaped member having a relatively small wall thickness, as shown in FIGS. 12 and 13. The cylindrical wall of the drain unit 20 has a thick-walled portion 72 at an upper part thereof. The thick-walled portion 72 has a thickness larger than that of the other portion by a predetermined amount, and protrudes outwardly. Thus, the outside diameter of the thick-walled portion 72 is substantially equal to or slightly smaller than the inside diameter of the through-hole 50 which is formed through the bottom portion of the guide passage portion 30. On the upper portion of the outer circumferential surface of the thick-walled portion 72, there is formed a square groove 78 extending in the circumferential direction and having a redetermined depth. Below the thick-walled portion 72, there are six bolt-hole portions 74 formed integrally, such that the six bolt-hole portions 74 are equi-angularly spaced apart from each other in the circumferential direction of the drain unit 20, and such that the six bolt-hole portions 74 protrude radially outwardly. The six bolt-hole portions 74 receive suitable bolts for fixedly attaching the drain unit 20 to the guide passage portion 30.

On the outer circumferential surface of the lower part of the thick-walled portion 72, there is a connecting rib 76 which is formed integrally with the six bolt-hole portions 52. The connecting rib 76 takes the form of an outward flange extending circumferentially of the drain unit 20, so as to connect the six bolt-hole portions 74 and reinforce the six hole portions 74. On the outer circumferential surface of the cylindrical wall of the drain unit 20 other than the thick-walled portion 72, there are integrally formed three reinforcing ribs 80 each of which extends vertically from the connecting rib 76 to the bottom wall of the drain unit 20. The three reinforcing ribs 80 are equi-angularly spaced apart from each other at an angular spacing interval of 120°. The connecting and reinforcing ribs 76, 80 cooperate to reinforce the six bolt-hole portions 74 and the cylindrical wall of the drain unit 20. A reference numeral 70 in FIGS. 12 and 13 designates a through-hole for receiving a drain valve of an automatic draining device 84 accommodated in the drain unit 20, as described below.

As is apparent from FIGS. 1 and 2, the caps 18 constructed as described above are attached to the respective access openings 41 formed in the inlet passage portion 22 and the outlet passage portion 24 constituting the inlet passage 37 and the outlet passage 39, respectively, while the drain unit 20 is attached to the guide passage portion 30 of the body 16.

More specifically described, each of the caps 18 is screwed to the corresponding one of the access openings 41 such that the small diameter portion of the disc-like threaded portion 64 having the external thread formed thereon is engaged with the internal thread portion 49 which is formed in the corresponding one of the inlet communication portion 34 and the outlet communication portion 40, and such that the four legs 68 of each of the caps 18 are inserted into the corresponding one of the inlet communication portion 34 of the inlet passage portion 22 and the outlet communication portion 40 of the outlet passage portion 24, while an 0-ring 82 is interposed between the large diameter portion of the threaded portion 64 and the tapered portion 43 of the access opening 41, whereby the caps 18 are fluid-tightly and removably attached to the respective access openings 41.

In the present embodiment, the legs 68 are inserted into the inlet communication portion 34 and the outlet communication portion 40, by attaching the caps 18 to the body 16. The legs 68 inserted into the inlet communication portion 34 and the outlet communication 40 are brought into abutting contact at their ends with the respective upper retainer plates 57 fitted in the upper openings of the first and second sleeves 26, 28, with a predetermined abutting force. Accordingly, the first and second packings 27, 29 accommodated in the first and second sleeves 27, 29 are interposed and gripped by and between the respective upper and lower retainer plates 57, 59 which are engaged with the shoulder portions 46. Two detents 88 are bolted to the plate-like flange 45, which is formed at the upper ends of the outer peripheries of the inlet communication portion 34 and the outlet communication portion 40, so as to surround the access openings 41. The detents 88 are brought into contact with the upper portion of the grooved outer circumferential surface of the caps 18, so as to prevent the caps 18 from being unscrewed from the access openings 41.

The drain unit 20 is attached to the body 16, with an O-ring 86 being disposed in the square groove 78 formed in the upper portion (the thick-walled portion 72) of the outer circumferential surface of the drain unit 20, such that the above upper portion (the thick-walled portion 72) is fitted in the through-hole 50 formed through the bottom portion of the bulging bottom portion 48 of the guide passage portion 30 of the body 16, and such that the six bolt-hole portions 74 formed on the upper end portion of the cylindrical wall of the drain unit 20 are located in alignment and abutting contact with the six bolt-hole portions 52 formed on the bulging bottom portion 48 in the guide passage portion 30 of the body 16. A suitable bolt is inserted into each of six holes which are provided by the alignment of the six pairs of bolt-hole portions 52, 72, and is screwed into a suitable nut or into the metallic connector 56 fixedly received in the bolt-hole portions 52. Thus, the drain unit 20 having the automatic draining device 84 accommodated therein is attached to the bottom of the bulging bottom portion 48 of the guide passage portion 30 of the body 16, with the through-hole 50 being fluid-tightly closed.

The caps 18 and the drain unit 20 are attached to the body 16, as described above, to complete the filter device 10 for compressed air, wherein only the inlet 32 and the outlet 38 are open to the exterior, and the compressed air entering the inlet passage portion 22 via the inlet 32 is passed through the first filter means 12, the guide passage portion 30 and the second filter means 14 into the outlet passage portion 24, and is then fed out via the outlet 38. Thus, a fluid passage for the compressed air is formed through the filter device 90.

In the filter device 10 for compressed air, vapor and/or liquid particles remaining in the compressed air are separated and removed from the compressed air, as described below.

First, the compressed air supplied through the inlet 32 is introduced through the inlet passage 37 formed in the inlet passage portion 22, into the first filer means 12 having a large cross sectional area. As the compressed air is passed through the first filter means 12, the vapor and/or the liquid particles such as water and oil contained in the compressed air are condensed or coalesced into liquid drops, by an effect of adiabatic expansion, or by an effect of an increased pressure as a result of a reduced velocity of flow of the compressed air through the first filter means 12.

Subsequently, as the compressed air which has passed through the first filter means 12 is introduced into the guide passage 44 formed in the guide passage portion 30, the vapor and/or the liquid particles are further condensed or coalesced by further adiabatic expansion or a further pressure increase as a result of further reduction of flow velocity of the compressed air in the guide passage portion 30, since the cross sectional area of the guide passage portion 30 is made larger than that of the first filter means 12.

The liquid drops, which have been produced by the above condensation or coalescence in the guide passage portion 30, or produced by the condensation or coalescence in the first filter means 12 and brought into the guide passage portion 30 by the flow of the compressed air, are effectively separated from the compressed air as a result of the reduced flow velocity of the compressed air, as the compressed air is introduced into the guide passage portion 30 whose cross sectional area is larger. And the separated liquid drops are dropped by gravity, through the through-hole 50 into the drain unit 20 attached to the bottom portion of the guide passage portion 30. In this case, some of the liquid drops may stick to the first packing 27 of the first filter means 12, without being brought into the guide passage portion 30 by the flow of the compressed air. Even these liquid drops are dropped through the guide passage portion into the drain unit 20, due to their own weight. The liquid drops, which have been dropped into the drain unit 20 as described above, are discharged through the automatic draining device 84 to the exterior.

The compressed air, from which the vapor and/or the liquid particles have been separated and removed as described above, is introduced into the second filter means 14 whose cross sectional area is smaller than that of the guide passage portion 30, so that the compressed air is subject to the effect of the adiabatic expansion, or an effect owing to a pressure decrease as a result of an increased velocity of flow of the compressed air through the second filter means 14. Further, as the compressed air is passed through the second packing 29 of the second filter means 14, water and/or oil in the form of liquid particles remaining in the compressed air is evaporated by an effect of whirlpool phenomenon of the air flow, or is absorbed by the second packing 29, while dust in the form of solid particles remaining in the compressed air is caught by the second packing 29.

As a consequence, the compressed air which has been fed out from the outlet 38 through the outlet passage 39 formed in the outlet passage portion 24 does not contain the liquid and solid particles such as the water and oil.

As described above, the filter device 10 for compressed air according to the present embodiment is constructed such that the compressed air introduced through the inlet passage 37 into the body 16 is further introduced into the first filter means 12 so as to be passed through the first packing 27 of the first filter means 12, and is then introduced through the guide passage 44 into the second filter means 14 so as to be passed through the second packing 29 of the second filter means 14, so that the compressed air is cleaned and dried with substantially complete removal of the liquid particles such as water and oil and the solid particles such as dust.

The present filter device 10 having such a good filtering performance is constructed such that the first and second sleeves 26, 28, the inlet passage portion 22, the guide passage portion 30 and the outlet passage portion 24 are integrated with each other to form the body 16 as a single unit, such that the access openings 41 are formed through the inlet passage portion 22 and the outlet passage portion 24 so as to remove the first and second packings 27, 29 through the access openings 41, and such that the caps 18 are fluid-tightly and removably attached to the respective access openings 41. Unlike the conventional filter device, therefore, the present filter device 10 does not require time-consuming operations such as disassembling of the filter device 10 into its component parts, upon replacing the first and second packings 27, 29 clogged with dust and/or grease. In the present filter device 10, the clogged first and second packings 27, 29 can be removed from the first and second sleeves 26, 28 through the access openings 41, and the clean first and second packings 27, 29 can be accommodated in the first and second sleeves 26, 28, by simply removing the caps 18 from the access openings 41. And further, after the replacement of the packings 27, 29, all that has to be done is simply attaching the caps 41 to the access openings 41. Thus, it is not necessary to carry out a conventionally required cumbersome operation such as re-assembling the component parts.

As described above, in the filter device 10 for compressed air according to the present embodiment, the first and second packings 27, 29 of the first and second filter means 12, 14 can be very easily and quickly replaced without any cumbersome and time-consuming operation, which is required in the conventional device.

Further, since the present filter device 10 is constructed, as described above, such that the first and second sleeves 26, 28, the inlet passage portion 22, the guide passage portion 30 and the outlet passage portion 24 are integrated with each other to form the body 16 as a single unit, the present filter device 10 assures a remarkable increase in fluid-tightness reliability, as compared with that of the conventional device wherein separate parts are connected by bolts through suitable packings.

Besides, the present filter device 10 is constructed such that each of the caps 18 attached to the body 16 includes the knob portion 66 and the threaded portion 64, so that the caps 18 are removably attached to the access openings 41 by engagement of the threaded portions 64 having the respective external threads with the internal thread portions 49 formed on the inlet communication portion 34 and the outlet communication portion 40. According to this construction, it is possible to rotate the caps 18 relative to the access openings 41 through the knob portion 66 without using a particular tool, so as to easily attach and remove the caps 18 to and from the access openings 41. As a result, the replacement of the first and second packings 27, 29 can be made more easily and quickly.

Further, the present filter device 10 is constructed such that the access openings 41 closed by the caps 18 are defined by the respective upper openings of the inlet passage portion 22 and the outlet passage portion 24 which constitute the inlet passage 37 for introducing the compressed air into the body 16 and the outlet passage 39 for discharging the compressed air out to the exterior, respectively. According to this arrangement, even if the compressed air leaks out from the body 16 through the access openings 41, the air leakage has a comparatively small influence on the flow velocity and the pressure of the compressed air flowing through the first and second sleeves 26, 28 and the guide passage portion 30, as compared with an arrangement wherein the compressed air may leak through the first sleeve 26 and/or second sleeve 28 and/or the guide passage portion 30. Accordingly, the present arrangement prevents or minimizes a deterioration of the filtering performance of the first and second filter means 12, 14.

Further, in the present filter device 10, the legs 68 are held in abutting contact at their top ends with the upper retainer plates 57, which are fitted in the respective upper openings of the first and second sleeves 26, 28, with a predetermined abutting force. Accordingly, the first and second packings 27, 29 accommodated in the first and second sleeves 27, 29 are interposed between the upper retainer plates 57 and the shoulder portions 46 with which the lower retainer plates 59 are engaged. Each of the lower retainer plates 59 is fitted in the lower opening of one of the first and second sleeves. This construction effectively prevents the first and second packings 27, 29 from being displaced by the flow of the compressed air.

Further, in the present filter device 10, since the body 16 is made of the transparent synthetic resin, the state of clogging of the first and second packings 27, 29 with dust and/or grease can be observed through the transparent body 16, making it easy to know a time of replacement of the packings 27, 29.

Further, in the present filter device 10, the plate-like flange 45, which is formed at the upper ends of the outer peripheries of the inlet communication portion 34 and the outlet communication portion 40 so as to surround the access openings 41, has the two detents 88 attached thereto by suitable bolts. The detents 88 are held in contact with the upper portion of the grooved outer circumferential surface of the caps 18, so as to prevent the caps 18 from being unscrewed from the access openings 41. Thus, the compressed air is effectively prevented from leaking through the access openings 41.

Further, in the present filter device 10, the first packing 27 of the first filter means 12 is a metallic-fiber aggregation which is formed by randomly aggregating a large number of shortfibers or longfibers 58 made of metallic materials. Therefore, it is not necessary to weave or knit the metallic fibers 58, as required for the conventional device, for forming the first packing 27, so that the first packing 27 can be formed with improved efficiency and at a reduced cost. Besides, the first packing 27 is constituted by a comparatively small amount of the metallic fibers 58, but has a fiber destiny which is equal to or than the one employed in the conventional device. Thus, the first filter means 12 assures an excellent performance in the condensation and/or coalescence of the vapor and/or liquid particles, and has a reduced weight, leading to a reduced weight of the filter device 10, and a reduced material cost owing to the reduced amount of the metallic fibers 58.

Further, in the present filter device 10, the metallic-fiber aggregation in the form of the first packing 27 constitutes the roll 62 of the sheet-like fabric 60 made of the large number of metallic fibers 58 complicatedly tangled with each other. Thus, the first packing 27 can be handled as a single piece having a predetermined shape although the first packing 27 is made of the large number of metallic fibers 58. The first packing 27 can be easily installed and removed into and from the first sleeve 26 of the first filter means 12. Besides, the first packing 27 is fitted in the first sleeve 26 without a minimum amount of clearance therebetween, assuring an excellent filtering performance.

In the present filter device 10, as described above, the first packing 27 of the first filter means 12 is a metallic-fiber aggregation which is formed by randomly aggregating a large number of short fibers or long fibers 58 made of metallic materials. Thus, the first filter means 12 is capable of exhibiting substantially the same filtering performance as that of a conventional wire mesh fabric formed of metallic materials, while at the same time the first filter means 12 has reduced weight and cost of manufacture. This aspect can be understood from a result of following experiments.

First, a sheet-like fabric having a length of about 300 mm, a width of about 75 mm and a thickness of about 5 mm was formed by randomly aggregating a large number of short fibers or long fibers made of stainless steel fibers. Each of the fibers has a substantially rectangular cross sectional shape having short sides of about 0.06 mm and long sides of about 0.15 mm. Additionally, a wire mesh fabric having the same dimensions as the above-described sheet-like fabric was formed by weaving or knitting stainless steel fibers each of which has a thickness of about 0.11 mm. The measured weight of the sheet-like fabric was 20.5 g, while the measured weight of the wire mesh fabric was 65.0 g. This result proved that the sheet-like fabric which is formed by randomly aggregating a large number of short fibers or long fibers made of metallic materials has a smaller weight than the conventional wire mesh fabric.

Figure 14:
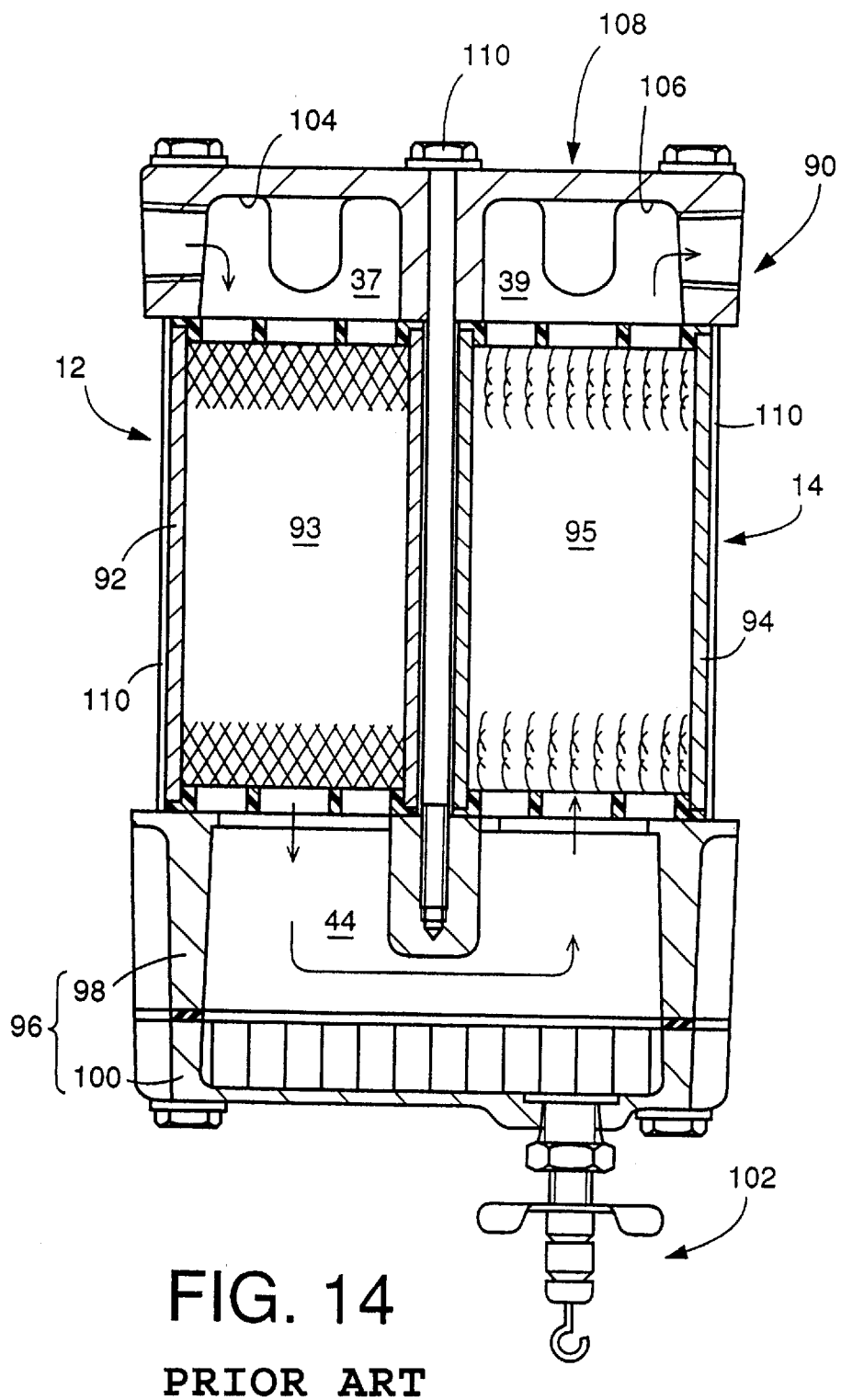
FIG. 14 is a view corresponding to that of FIG. 1, showing a conventional filter device.

Secondly, two kinds of fabric rolls were prepared by winding the sheet-like fabric and the wire mesh fabric, so as to obtain two kinds of first packings. Then, the two kinds of first packings were accommodated in the two conventional filter devices 90 each constructed as shown in FIG. 14, respectively, one of which has the fabric roll made of the sheet-like fabric and the other of which has the fabric roll made of the wire mesh fabric. Subsequently, a test was conducted to check if the pressure of the compressed air was lowered in each of the filter device 90, and if any water drops were brought up into the second filter means 14. In the test, the compressed air of 3 $kgf/cm^2$ was introduced into each of the two filter devices 90 at a flow rate of 375 L/min (equivalent to 750 L/min. at 7 $kgf/cm^2$), at three different states of water supply to the compressed air: 1 L/hour, 3 L/hour and 5 L/hour.

The test revealed that the filter device 90 employing the roll of the sheet-like fabric as the first packing 93 of the first filter means 12 had no water drops brought up into the second filter means 14, and a pressure drop of 0.03 $kgf/cm^2$ of the compressed air, irrespective of the variation in the rate of the water supply to the compressed air. The filter device 90 employing the roll of the wire mesh fabric as the first packing 93 had no water drops brought up into the second filter means 14, and a pressure drop of 0.02 $kgf/cm^2$ of the compressed air, irrespective of the variation in rate of supply of the water to the compressed air.

Thus the test clearly shows that in the filter device 90 whose first packing 93 of the first filter means 12 employs the roll of the sheet-like fabric formed by randomly aggregating a large number of short fibers or long fibers made of stainless steel fibers, the vapor and/or liquid particles contained in the compressed air are efficiently condensed or coalesced and are effectively separated from the compressed air, by passing the compressed air through the first filter means 12 into the guide passage portion 98, as well as in the filter device 90 whose first packing 93 employs the roll of the wire mesh fabric formed by weaving or knitting stainless steel fibers. The value of the pressure drop in the filter device 90 employing the sheet-like fabric as the first packing 93 is larger than that in the filter device 90 employing the wire mesh fabric. However, the difference 0.01 kgf/cm$^2$ is considered to be very small, in view of a fact that the value of the pressure drop is 0.037 kgf/cm$^2$ in the filter device 90 wherein the first packing 93 was not provided in the first filter means 12. Hence, it will be easily understood that the filter device 90 employing the sheet-like fabric exhibits a filtering performance not significantly differently from that of the filter device 90 employing the wire mesh fabric.

While there has been described one embodiment of the present invention, for illustrative purpose only, it is to be understood that the invention is not limited to the details of the described embodiment.

In the above-described embodiment, the body 16 is integrally formed of a transparent synthetic resin such as polycarbonate, polyethylene terephthalate and polyamide. However, any other kinds of synthetic resin materials may be selected as needed by taking account of a desired strength of the body 16.

In the above-described embodiment, the first packing 27 of the first filter means 12 is the roll 62 which is a wind of the sheet-like fabric 60 formed by randomly aggregating a large number of the short fibers or long fibers 58 made of stainless steel fibers or other metallic materials. However, the first packing 27 may be a roll of a wire mesh fabric formed by weaving or knitting suitable metallic steel fibers, or alternatively, a roll of mesh fabric formed by obliquely intersecting and bonding together linear synthetic resins diagonally with each other. Further, while the metallic-fiber aggregation formed by randomly aggregating a large number of metallic short fibers or long fibers 58 takes the form of the roll 62 of the sheet-like fabric 60 in the above embodiment, a random aggregation of the metallic fibers 58 which does not has a specific form such as a roll can be used as the first packing 27. If the metallic fiber aggregation not having a specific form is used as the first packing 27, an operation required for forming the aggregation into the desired form can be eliminated, making it possible to simplify a production process of the first packing 12 or the filter device 10.

In the above-described embodiment, the automatic draining device 84 having a known structure is provided in the drain unit 20, so that the liquid, which has dropped and been stored in the drain unit 20 is discharged into the exterior. However, this automatic draining device 84 may be replaced by the weep valve 102 which is provided in the filter device 90 as shown in FIG. 14, or alternatively, by any one of known drain devices.

In the above-described embodiment, the access openings 41 are formed in the inlet passage portion 22 and the outlet passage portion 24, respectively, so as to remove the first and second packings 27, 29 from the first and second sleeves 26, 28 of the body 16. However, the positions of the access openings are not limited to those of the described embodiment. The access openings may be formed in any other portions of the body.

In the filter device 10 of the above-described embodiment, the caps 18 as the closure members are screwed to the access openings 41 with the O-rings 82 interposed therebetween. However, the construction for attaching the closure members is not limited to that of the embodiment, provided the closure members fluid-tightly close the access openings and removable from the access openings.

Further, in the above-described embodiment, each of the caps 18 has the four integrally formed legs 68. The legs 68 are brought into abutting contact with the upper retainer plates 57 provided at the respective upper open end portions of the first and second sleeves 26, 28, with a predetermined abutting force, whereby the first and second packings 27, 29 are interposed between the upper retainer plates 57 and the shoulder portions 46 which are formed at the respective lower open end portions of the first and second sleeves 26, 28, so that the packings 27, 29 are fixedly accommodated in the first and second sleeves 26, 28, respectively. However, the number and the shapes of the legs 68 are not limited to those of the embodiment, and the legs 68 do not have to be necessarily formed on the caps.

Further, it is to be understood that the entire shape of the filter device, the shapes of the closure members, the drain unit, and the other components of the device are not limited to those of the described embodiment.

It is to be understood that the present invention may be embodied with various other changes, modifications and improvements, which may occur to those skilled in the art, without departing from the scope of the invention.

What is claimed is:

1. A filter device for compressed air, comprising:

a first filter means having a first packing accommodated in a first sleeve thereof;

a second filter means having a second packing accommodated in a second sleeve thereof;

an inlet passage portion having an inlet and an inlet passage, said inlet passage portion cooperating to connect with both an exterior of said filter device and said first sleeve to introduce said compressed air from said exterior into said first filter means;

a guide passage portion defining a guide passage that connects said first sleeve and said second sleeve to guide said compressed air from said first filter means into said second filter means; and an outlet passage portion having an outlet and an outlet passage that cooperates to connect with both of said second sleeve and said exterior to discharge said compressed air from said second filter means to said exterior; wherein said compressed air that has been introduced through said inlet passage portion is introduced through said first filter means into said guide passage portion, whereby vapor and liquid particles contained in said compressed air are at least one of condensed and coalesced for separation from said compressed air, said compressed air from which said vapor and liquid particles having been separated by being introduced through said guide passage portion into said second filter means whereby said liquid particles that remain in said compressed air are absorbed by said second filter means and vaporized; and further wherein said first and second sleeves, said inlet passage portion, said guide passage portion and said outlet passage portion are formed of a synthetic resin, integrally with each other, so as to constitute a body of said filter device, said body being provided with access openings through which said first and second packings are removed from said filter device, two closure members being removably attached to each respective access openings, independently of each other, so as to fluid-tightly close said access openings.

2. A filter device for compressed air according to claim 1, wherein said first packing of said first filter means is a metallic fiber aggregation which is formed by randomly aggregating a large number of short fibers or long fibers made of a metallic material.

3. A filter device for compressed air according to claim 1, wherein said body is formed of a transparent synthetic resin, as a single unit.

4. A filter device for compressed air according to claim 1, wherein said first sleeve includes a first communication portion which communicates with said inlet passage portion and which is dimensioned to permit said first packing to be removed therethrough, while said second sleeve includes a second communication portion which communicates with said outlet passage portion and which is dimensioned to permit said second packing to be removed therethrough, each of said inlet passage portion and said outlet passage portion having one of said access openings formed therethrough, so that said first and second packings can be removed from said first and second sleeves, respectively, through said access openings.

5. A filter device for compressed air according to claim 4, wherein a first retainer plate having a plurality of throughholes formed therethrough is removably attached to said first communication portion that communicates with said inlet passage portion and said second communication portion that communicates with said outlet passage portion, and said closure member has at least one leg provided at a portion thereof opposed to said first retainer plate and extending towards said first retainer plate, said first sleeve including a third communication portion that communicates with said guide passage portion, while said second sleeve includes a fourth communication portion that communicates with said guide passage portion, and wherein a protruding shoulder portion is provided at said third communication portion and said fourth communication portion, said protruding shoulder portion protruding by a predetermined distance radially inwardly of said first and second sleeves, so that each of said first and second packings is interposed between said first retainer plate and said protruding shoulder portion, while said closure member is attached to each of said access openings such that said first retainer plate is pressed by said at least one leg of said closure member.

6. A filter device for compressed air according to claim 1, further comprising a drain unit that is attached to said guide passage portion of said body, said drain unit having a draining device through which liquid drops produced by condensation and coalescence of said vapor or liquid particles are discharged to said exterior.

7. A filter device for compressed air according to claim 1, wherein each of said two closure members includes a knob portion that is provided on one of axially opposite faces of said closure member that is exposed to said exterior.

8. A filter device for compressed air according to claim 1, wherein each of said inlet passage portion and said outlet passage portion has a metallic connector fixed in a hole of each of said inlet passage portion and said outlet passage portion, for connecting a suitable pipe with said filter device.

9. A filter device for compressed air according to claim 2, wherein said metallic fiber aggregation has a sheet-like shape so as to be wound up into a roll having a cylindrical shape corresponding to an internal shape of said first sleeve.

10. A filter device for compressed air according to claim 5, wherein a second retainer plate having a plurality of through-holes formed therethrough is removably attached to said protruding shoulder portion, so that each of said first and second packings is interposed between said first retainer plate and said second retainer plate.

* * * * *